(Model.)
A. A. WHITELY.
EXERCISING APPARATUS.
No. 418,257. Patented Dec. 31, 1889.
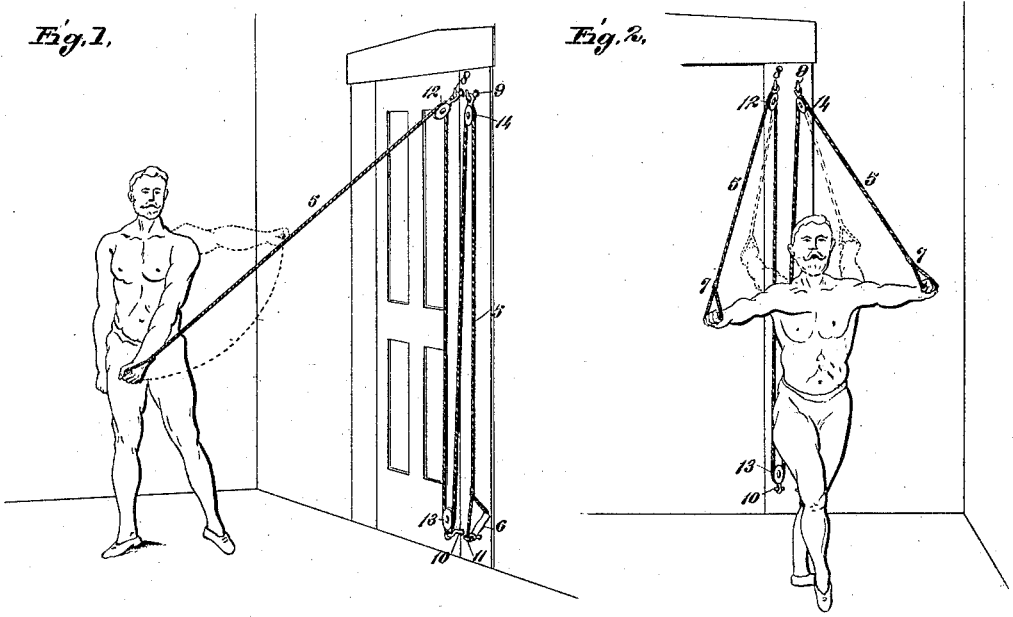
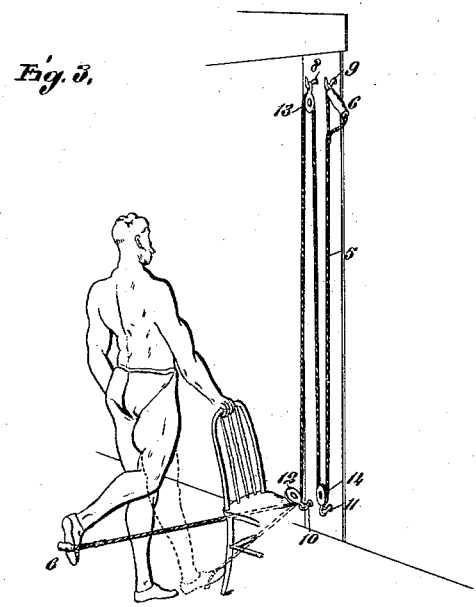
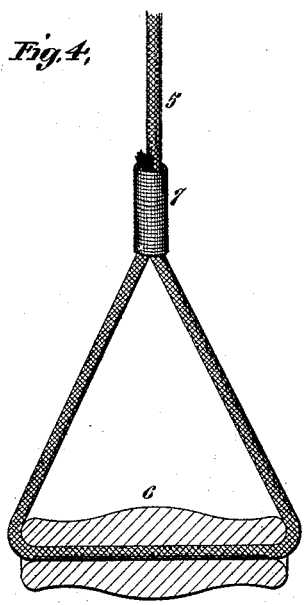
Witnesses:
G. S. Hinchman Jr.
Charles Pickles.
Inventor:
Alexander A. Whitely,
By Fowler & Fowler
Attorneys.

UNITED STATES PATENT OFFICE.

ALEXANDER A. WHITELY, OF ST. LOUIS, MISSOURI.

EXERCISING APPARATUS.

SPECIFICATION forming part of Letters Patent No. 418,257, dated December 31, 1889.

Application filed May 31, 1889. Serial No. 312,795. (Model.)

*To all whom it may concern:*

Be it known that I, ALEXANDER A. WHITELY, a citizen of the United States, residing at St. Louis, in the State of Missouri, have invented certain new and useful Improvements in Exercising Apparatus, of which the following is such a full, clear, and exact description as will enable any one skilled in the art to which it appertains to make and use the same, reference being had to the accompanying drawings, forming part of this specification.

My invention relates to elastic-cord exercising apparatus.

In the elastic-cord exercising devices as now constructed the elastic part of the same is made very short, and by reason of this fact, when elongated to any extent, they produce a sudden jerk on the recoil that causes a very unpleasant sensation to the user. Where the elastic cord has a sufficient elasticity for exercising purposes, and is elongated, say, to double its length, the force tending to bring it to its normal length is very great. The increase of force in stretching an elastic band or cord is inversely proportional to the length of such cord and depends upon the extent of the elongation—that is to say, the longer the elastic cord the less the increase of resistance to elongation; or, to state the same thing in other words, the variation of force in stretching an elastic cord, band, or spring is proportional to the ratio existing between the elongation and the length of the cord.

In my exercising apparatus I make the cord of great length and elastic throughout its entire length, so that the ratio of the elongation to the length of the cord will be very small, and therefore the variation in resistance very small, and the jerky action spoken of in using the apparatus obviated.

The invention also has for its object to construct a simple exercising apparatus that will permit of a great variety of movements.

The invention will best be understood by referring to the accompanying drawings, in which—

Figure 1 is a perspective of my exercising apparatus, showing one way in which the same may be used. Fig. 2 is a face view thereof, showing another way in which the apparatus may be used; Fig. 3, a perspective illustrating a third way in which the apparatus can be used, and Fig. 4 a view showing the handles of the elastic cord, on an enlarged scale.

The same figures of reference indicate the same parts throughout the several views.

5 is the elastic cord, which is made of great length and is provided with a loop at each end, which may be furnished with a handle 6, of wood, that has a hole in it through which the elastic cord passes. Said handle 6 is free to rotate on the cord. The free end of the elastic cord is attached to the main part thereof by a splice 7. The wooden part 6 may be dispensed with, if desired, and the loops at the ends of the elastic cord used without such wooden part. The cord I make elastic throughout its entire length, even including the loops at each end, so as to make the length of the elastic part as great as possible, and thereby the ratio existing between the elongation and the length of the cord as small as possible, to render the variation in resistance in elongating the same as small as can be.

To any immovable part of a building or other structure I secure, preferably, four hooks 8, 9, 10, and 11, respectively. The hooks 8 and 9 may be arranged above the hooks 10 and 11. On the elastic cord 5, I place three pulleys 12, 13, and 14, each having an eyebolt adapted to engage with the hooks before referred to. The eyebolts are swiveled to said pulleys, so that the pulleys may turn in any direction. The hooks and eyebolts and the swivel referred to make in effect a universal joint. The pulleys are constructed to be noiseless in turning. These pulleys I do not claim as new, as the same are now in general use and on sale.

If it be desired to exercise the arm, abdominal, or back muscles, the two pulleys 12 and 14 nearest the handles are attached to the upper hooks 8 and 9, the middle pulley 13 attached to the lower hook 10, and one of the handles 6 secured over the hook 11. If, now, it be desired to exercise the arm and chest muscles particularly, the handle 6 is detached from the hook 11 and both handles grasped by the hands of the user, as shown in Fig. 2. The leg-muscles may be exercised by reversing the position of the apparatus shown in Fig. 1—that is, by placing the pulley 13 on one of the upper hooks, securing one of the handles 6 to the other upper hook, and the pulleys 12 and 14 to the hooks 10 and 11, respectively. The free handle in this case may then be placed over the foot of the person using the apparatus.

By the use of this apparatus a great variety of movements can be secured. The elastic cord is made so long that there is practically no variation in resistance produced by stretching the same, the force required to stretch the cord at the first part of the movement being practically the same as that required to elongate it at the latter part of the movement. It will be noted in the different figures that the elastic cord returns upon itself two or three times and that the elongation of the same is never over more than one-eighth of the length of the said cord, and usually much less than this.

The apparatus is easily applied and may be used in one's room without inconvenience. When not in use, it may be taken down, if desired, by simply slipping the handles off of the hooks and detaching the pulleys from the same. The hooks are the only thing left and they are so small as not to be noticeable.

The apparatus may be applied to the hooks in other ways than those specified. For instance, the pulley 13 (see Fig. 1) may be applied to one of the upper hooks and the pulleys 12 and 14 applied to the lower hooks, if desired. So, also, the position of the apparatus shown in Figs. 1 and 3 can be reversed, if desired.

In my invention the stretching instead of taking place over a short elastic cord takes place throughout the entire length of the elastic cord 5, making the movements agreeable and devoid of jerk, thus producing about the same effect as lifting a weight without the noise and inconvenience incident to the same. So far as I am aware I am the first to construct an exercising apparatus wherein an elastic cord runs over pulleys.

Having fully set forth my apparatus, what I desire to claim, and secure by Letters Patent of the United States as my invention, is—

1. As an exercising apparatus, a cord elastic throughout its entire length, having pulleys thereon over which the elastic cord travels, and hooks to which said pulleys are adapted to be secured.

2. The combination, to form an exercising apparatus, of the cord 5, elastic throughout its entire length, loops at each end thereof, pulleys 12, 13, and 14 thereon, over which said cord travels, and hooks 8, 9, 10, and 11, affixed to some immovable object, to which said pulleys are adapted to be secured.

In testimony whereof I have hereunto set my hand and affixed my seal, this 28th day of May, 1889, in the presence of two subscribing witnesses.

ALEXANDER A. WHITELY. [L. S.]

Witnesses:
A. C. FOWLER,
M. S. REEDER.